US010429640B2

United States Patent
Uezono et al.

(10) Patent No.: US 10,429,640 B2
(45) Date of Patent: Oct. 1, 2019

(54) IMAGE FORMING APPARATUS PERFORMING PROCESSING IN ACCORDANCE WITH REFLECTIVE SURFACE OF ROTATING POLYGONAL MIRROR FOR SCANNING PHOTOSENSITIVE MEMBER

(71) Applicant: CANON KABUSHIKI KAISHA, Tokyo (JP)

(72) Inventors: Takaomi Uezono, Meridian, ID (US); Hiroyuki Yamazaki, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/039,042

(22) Filed: Jul. 18, 2018

(65) Prior Publication Data

US 2019/0033578 A1  Jan. 31, 2019

(30) Foreign Application Priority Data

Jul. 26, 2017 (JP) .................................. 2017-144696
Apr. 26, 2018 (JP) .................................. 2018-085727

(51) Int. Cl.
G03G 15/04 (2006.01)
H04N 1/50 (2006.01)
(Continued)

(52) U.S. Cl.
CPC ......... *G02B 26/127* (2013.01); *G02B 26/124* (2013.01); *G03G 15/043* (2013.01);
(Continued)

(58) Field of Classification Search
CPC ............ G03G 15/04; G03G 15/04027; G03G 15/041; G03G 15/0415; G03G 15/043;
(Continued)

(56) References Cited

U.S. PATENT DOCUMENTS 5,561,455 A   10/1996   Teshigawara et al. ....... 347/131
9,057,975 B2   6/2015   Nihei et al. .......... G03G 15/043
(Continued)

FOREIGN PATENT DOCUMENTS

JP   H07-160086   6/1995
JP   2006-231751   9/2006
(Continued)

*Primary Examiner* — Carla J Therrien
(74) *Attorney, Agent, or Firm* — Venable LLP

(57) ABSTRACT

An image forming apparatus includes: a specification unit configured to perform surface specification processing for specifying a reflective surface that deflects light; a correction unit configured to perform correction processing for correcting image data in accordance with which reflective surface deflects light; and a control unit configured to control so as to cause scanning of a first photosensitive member to start before the surface specification processing completes, and control so as to, after the surface specification processing completes, cause the correction processing to be performed, with respect to image data for causing light to be emitted from a second light source and in accordance with a specification result of the surface specification processing, and cause scanning of the second photosensitive member to start.

20 Claims, 14 Drawing Sheets

(51) Int. Cl.
- *G02B 26/12* (2006.01)
- *G06K 15/12* (2006.01)
- *H04N 1/52* (2006.01)
- *G03G 15/043* (2006.01)
- *G06K 15/02* (2006.01)

(52) U.S. Cl.
CPC ..... *G03G 15/04027* (2013.01); *G06K 15/021* (2013.01); *G06K 15/1219* (2013.01); *H04N 1/50* (2013.01); *H04N 1/52* (2013.01); *G03G 2215/047* (2013.01); *G06K 15/129* (2013.01)

(58) Field of Classification Search
CPC ......... G03G 2215/047; G03G 15/0435; G06K 15/1209; G06K 15/1214; G06K 15/1219; G06K 15/129; G02B 26/127; G02B 26/124

See application file for complete search history.

(56) References Cited

U.S. PATENT DOCUMENTS

| | | | |
|---|---|---|---|
| 9,575,314 B2 | 2/2017 | Araki | G02B 26/124 |
| 9,927,735 B2 | 3/2018 | Araki et al. | G03G 15/043 |
| 2014/0168340 A1* | 6/2014 | Nihei | G03G 15/043 |
| | | | 347/118 |
| 2018/0231930 A1* | 8/2018 | Fukaya | G03G 15/6585 |

FOREIGN PATENT DOCUMENTS

| | | |
|---|---|---|
| JP | 2013-117699 | 6/2013 |
| JP | 2014-133409 | 7/2014 |

\* cited by examiner

FIG. 3A

| IMAGE FORMING ORDER | COLOR | SCREEN ANGLE | NUMBER OF LINES (lines/inch) |
|---|---|---|---|
| FIRST | YELLOW | 90 | 300 |
| SECOND | MAGENTA | 75 | 145 |
| THIRD | CYAN | 105 | 145 |
| FOURTH | BLACK | 45 | 141 |

FIG. 3B

| COLOR | FREQUENCY (cycle/mm) |
|---|---|
| YELLOW | 5.9 |
| MAGENTA | 1.5 |
| CYAN | 1.5 |
| BLACK | 4.4 |

FIG. 3C

| IMAGE FORMING ORDER | COLOR | SCREEN ANGLE | NUMBER OF LINES (lines/inch) |
|---|---|---|---|
| FIRST | YELLOW | 45 | 141 |
| SECOND | MAGENTA | 90 | 300 |
| THIRD | CYAN | 105 | 145 |
| FOURTH | BLACK | 75 | 145 |

IMAGE FORMING APPARATUS PERFORMING PROCESSING IN ACCORDANCE WITH REFLECTIVE SURFACE OF ROTATING POLYGONAL MIRROR FOR SCANNING PHOTOSENSITIVE MEMBER

BACKGROUND OF THE INVENTION

Field of the Invention

The present invention relates to a control technique for an image forming apparatus.

Description of the Related Art

In an image forming apparatus, an electrostatic latent image is formed on a photosensitive member by scanning/exposing the photosensitive member, and a toner image is formed by developing the electrostatic latent image with toner. A polygonal mirror is used in order to scan the photosensitive member by light. Periodic fringe patterns known as moire can occur due to interference between screen periods of halftone dots in halftone processing, and position shift of dots (pixels) that occur at the surface period of the polygonal mirror. Japanese Patent Laid-Open No. 2013-117699 discloses a configuration for performing surface specification processing for specifying a reflective surface (a deflection surface) of a polygonal mirror, and electronically corrects a scanning position on a photosensitive member in accordance with the reflected light at each reflective surface in order to suppress moire.

With the configuration of Japanese Patent Laid-Open No. 2013-117699, it is not possible to perform image formation, more specifically the start of formation of an electrostatic latent image, until the surface specification processing completes after the start of print processing. Accordingly, an amount of time required for printing lengthens.

SUMMARY OF THE INVENTION

According to an aspect of the present invention, an image forming apparatus includes: a first light source and a second light source; a first photosensitive member corresponding to the first light source and a second photosensitive member corresponding to the second light source; a transfer unit configured to transfer a first image formed on the first photosensitive member to an image carrier, and to transfer a second image formed on the second photosensitive member onto the image carrier by overlapping the second image on the first image; a deflection unit configured to deflect light emitted by the first light source and the second light source so that the light emitted by the first light source and the second light source scans respectively corresponding photosensitive members, using at least one rotating polygonal mirror that has a plurality of reflective surfaces; a specification unit configured to perform surface specification processing for specifying a reflective surface that deflects light, out of the plurality of reflective surfaces of the rotating polygonal mirror, in a state where the rotating polygonal mirror is rotating; a correction unit configured to perform correction processing for correcting image data in accordance with which reflective surface, out of the plurality of reflective surfaces of the rotating polygonal mirror, deflects light; and a control unit configured to control so as to cause scanning of the first photosensitive member to start before the surface specification processing by the specification unit completes, and control so as to, after the surface specification processing by the specification unit completes, cause the correction processing to be performed by the correction unit, with respect to image data for causing light to be emitted from the second light source and in accordance with a specification result of the surface specification processing, and cause scanning of the second photosensitive member to start.

Further features of the present invention will become apparent from the following description of exemplary embodiments with reference to the attached drawings.

BRIEF DESCRIPTION OF THE DRAWINGS

FIG. 3A is a view illustrating an angle and a number of lines of each screen used in halftone processing.

FIG. 3B is a view for illustrating differences between the spatial frequency of each screen and the spatial frequency corresponding to the surface period of a polygonal mirror.

FIG. 3C is a view illustrating an angle and a number of lines of each screen used in halftone processing.

DESCRIPTION OF THE EMBODIMENTS

Exemplary embodiments of the present invention will be described hereinafter, with reference to the drawings. Note, the following embodiments are examples and the present invention is not limited to the content of the embodiments. Also, for the following drawings, elements that are not necessary in the explanation of the embodiment are omitted from the drawings.

First Embodiment

Figure 1:
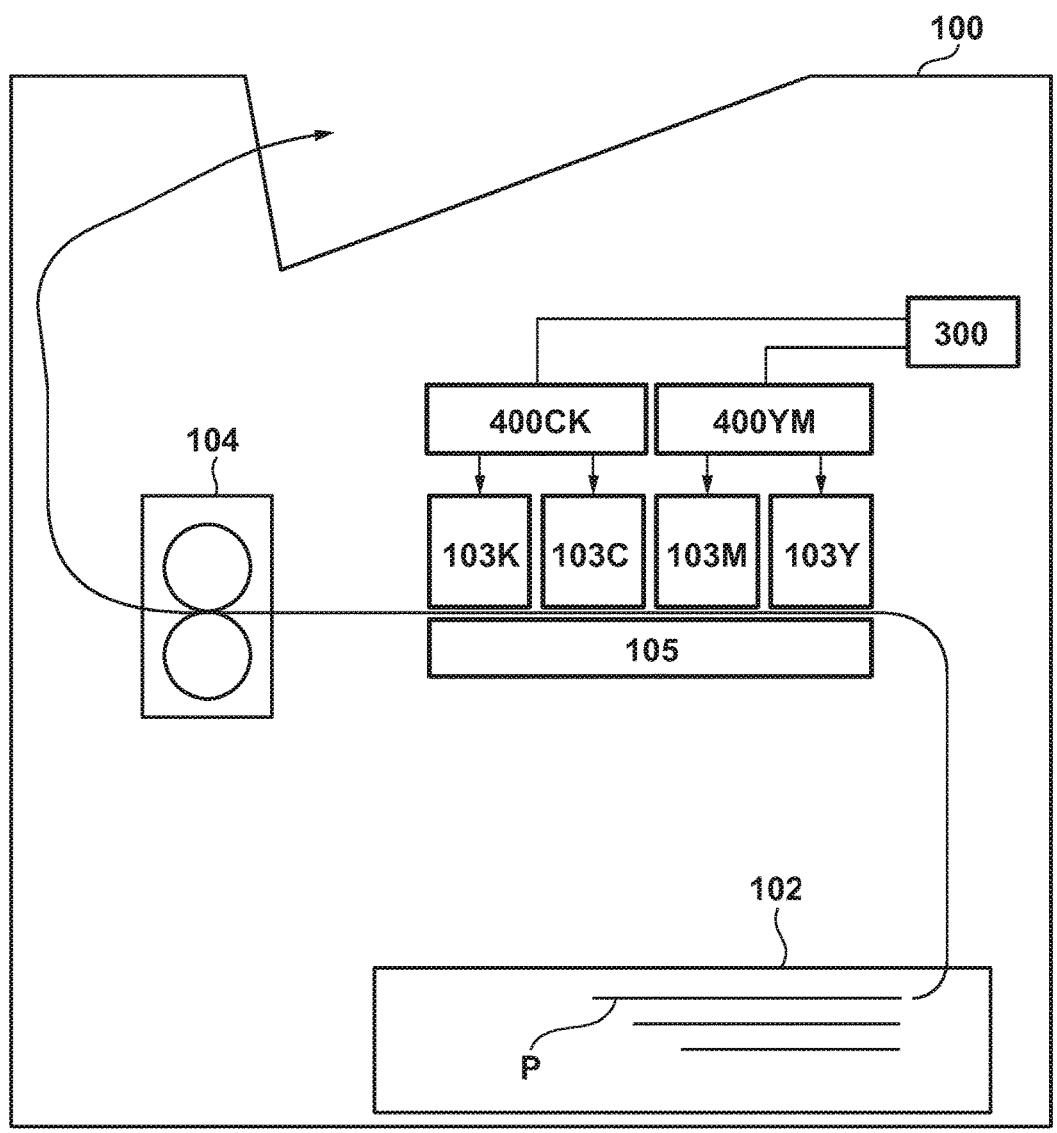
FIG. 1 is a configuration diagram of an image forming apparatus according to an embodiment.

FIG. 1 is a configuration diagram of an image forming apparatus 100 according to this embodiment. The image forming apparatus 100 comprises image forming units 103Y, 103M, 103C, and 103K corresponding to a plurality of colors yellow (Y), magenta (M), cyan (C), and black (K) which are used in image forming. An optical scanning apparatus 400YM scans and exposes photosensitive members for each of the image forming units 103Y and 103M by light to form an electrostatic latent image on each photosensitive member. An electrostatic latent image formed on the photosensitive member of the image forming unit 103Y is developed using yellow toner (developing agent) by a development unit of the image forming unit 103Y, and a yellow toner image is formed on the photosensitive member of the image forming unit 103Y. Similarly, an electrostatic latent image formed on the photosensitive member of the image forming unit 103M is developed using magenta toner by a development unit of the image forming unit 103M, and a magenta toner image is formed on the photosensitive member of the image forming unit 103M. An optical scanning apparatus 400CK scans and exposes photosensitive members for each of the image forming units 103C and 103K by light to form an electrostatic latent image on each photosensitive member. Similarly to the image forming unit 103Y and the image forming unit 103M, an electrostatic latent image formed on each photosensitive member of the image forming units 103C and 103K is respectively developed by cyan and black toner, and visualized as toner images. Each of the image forming units 103Y, 103M, 103C, and 103K transfers the toner image of the respective color to a recording material P as an image carrier that is fed from a sheet feeding unit 102 and conveyed by a transfer belt 105. Note that a full-color toner image is formed on the recording material P by the image forming units 103Y, 103M, 103C, and 103K each transferring and overlapping toner images on the recording material P. The recording material P to which the toner images are transferred is conveyed to a fixing apparatus 104. The fixing apparatus 104 pressurizes and heats the recording material P to fix the toner images to the recording material P. After the fixing of the toner images, the recording material P is discharged to outside of the image forming apparatus 100. Note that a control unit 300 controls the entirety of the image forming apparatus 100. Note that, description is given regarding a direct transfer method for directly transferring to the recording material P as an example, but the invention is not limited to this. Configuration may be taken to have an image forming apparatus of an intermediate transfer method that, by primary-transferring a toner image of each color to the intermediate transfer belt as an image carrier, forms overlapped images on the intermediate transfer belt, and secondary-transfers the overlapped images to a recording material P.

Figure 2:
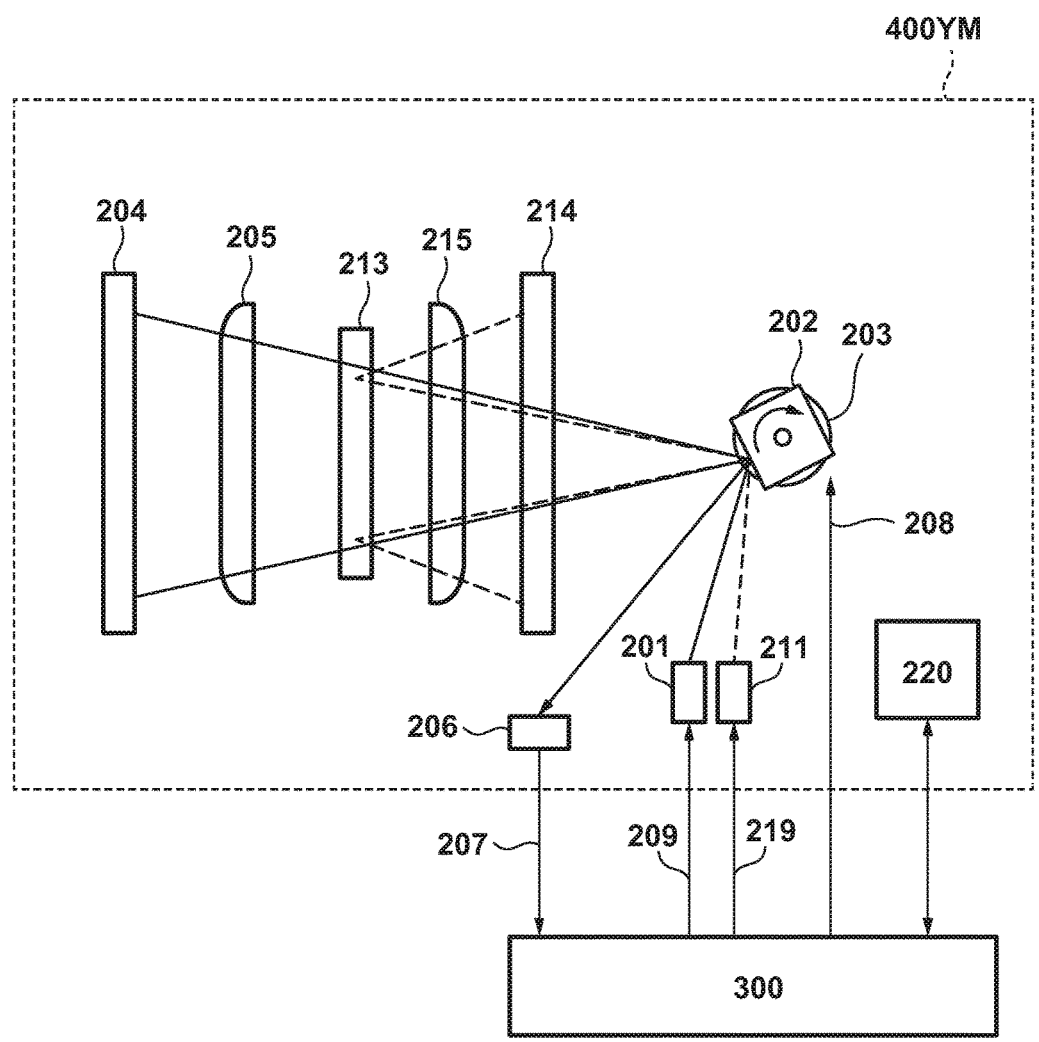
FIG. 2 is a configuration diagram for an optical scanning apparatus according to an embodiment.

Because the configurations of the optical scanning apparatuses 400YM and 400CK are similar, description using FIG. 2 is given below regarding the configuration of the optical scanning apparatus 400YM. Note that, for the optical scanning apparatus 400CK, it is assumed that the Y and M in the following description are interpreted as C and K. Light sources 201 and 211 respectively emit light for exposing a photosensitive member of the image forming unit 103Y and a photosensitive member of the image forming unit 103M. A polygonal mirror (also referred to as a rotating polygonal mirror) 202 has four reflective surfaces (also referred to as deflection surfaces) in the present embodiment, and deflects light emitted by the light sources 201 and 211 by causing reflection on the reflective surfaces. By rotating the polygonal mirror 202 by a motor 203, reflection directions of light emitted by the light sources 201 and 211 changed in accordance therewith. Light emitted by the light source 201 and reflected by the polygonal mirror 202 scans/exposes photosensitive member of the image forming unit 103Y via an image forming lens 205 and a reflective mirror 204. Light emitted by the light source 211 and reflected by the polygonal mirror 202 scans/exposes photosensitive member of the image forming unit 103M via a reflective mirror 213, an image forming lens 215, and a reflective mirror 214. In addition, reflected light is incident on a horizontal synchronization sensor 206 in accordance with a rotation position of the polygonal mirror 202. In a state where the rotating polygonal mirror is rotating, the horizontal synchronization sensor 206 outputs to the control unit 300 a horizontal synchronization signal 207 that indicates a timing when it received light. The horizontal synchronization signal 207 is used as a reference signal for scanning one scan line. The control unit 300 outputs to the motor 203 a motor drive signal 208 for causing the motor 203 to rotate based on the horizontal synchronization signal 207. In addition, in accordance with an image to form, the control unit 300 outputs to the light sources 201 and 211 light source driving signals 209 and 219 for controlling lighting of the light sources 201 and 211. A storage unit 220 stores various pieces of information relating to the optical scanning apparatus 400YM. Note that, in the present embodiment, two polygonal mirrors 202 are used for the four colors used in image forming, but the number of polygonal mirrors 202 is not limited to two. For example, one polygonal mirror 202 can be used to scan/expose four photosensitive members corresponding to respective colors. Alternatively, four polygonal mirrors 202 corresponding to respective photosensitive members can be used to perform scanning/exposure.

Next, description is given regarding interference between a period of a halftone dot screen (dither) used in halftone processing, and a surface period of the polygonal mirror 202. The surface period P of the polygonal mirror 202 is represented by the following formula (1) for each integer N less than a number of surfaces thereof.

$$P = \text{number of surfaces}/N \quad (1)$$

Assuming that a number of lines (a number of scan lines) per single inch is 600 (lines), a spatial frequency (lines/inch) F corresponding the surface period of the polygonal mirror is represented by formula (2) below.

$$F = 600/P = 600 \times N/\text{number of surfaces} \quad (2)$$

Because the number of surfaces of the polygonal mirror 202 in the present embodiment is four, the spatial frequencies corresponding to N=1, 2, and 3 are respectively 150, 300, and 450.

Next, screen angles and number of lines of halftone dots for each color in the present embodiment are shown in FIG. 3A. Note that, in FIG. 3A, an image formation order is an order for forming an image on a photosensitive member. As illustrated by FIG. 1, in the present embodiment, the image forming unit 103Y, which is most upstream in a conveyance direction of the recording material P, first forms an electrostatic latent image on the photosensitive member. Subsequently, electrostatic latent images are formed on photosensitive members in the order of the image forming units 103M, 103C, and 103K. In the present embodiment, a screen angle of black which is easiest to visually recognize is set to 45 degrees which is a low visual sensitivity. Screens for magenta and cyan, which are the next easiest to visually recognize after black, are respectively set to 75 degrees and 105 degrees. The yellow screen has an angle difference of 15 degrees with respect to each of the magenta and cyan screens. Furthermore, in order to suppress interference with the magenta and cyan screens, the number of lines is set high for yellow screens. Typically, stability of density decreases the higher the number of lines is, but because yellow, which has a low brightness difference due to tone, is difficult to visually recognize, there tends not to be an influence on an image even with a high number of lines.

Figure 4A:
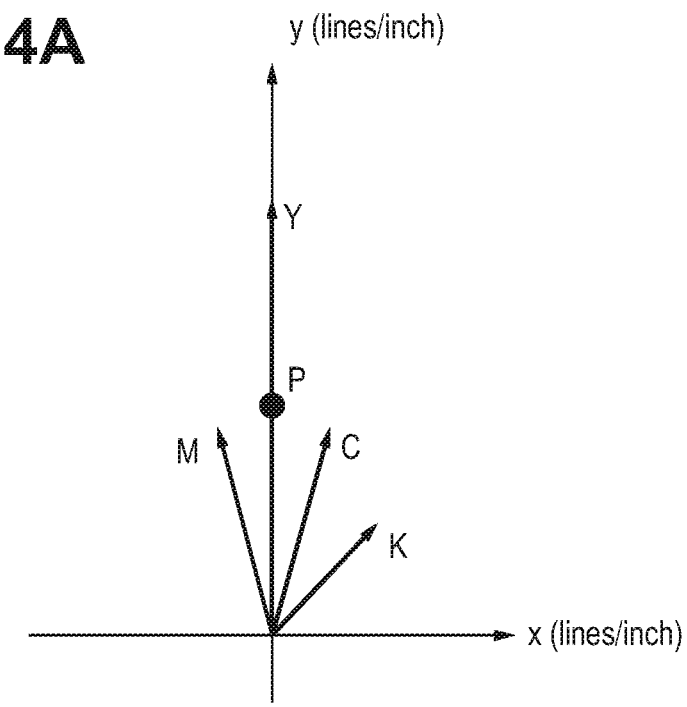
FIGS. 4A and 4B are views illustrating a spatial frequency of each screen and a spatial frequency corresponding to the surface period of the polygonal mirror according to an embodiment.
Figure 4B:
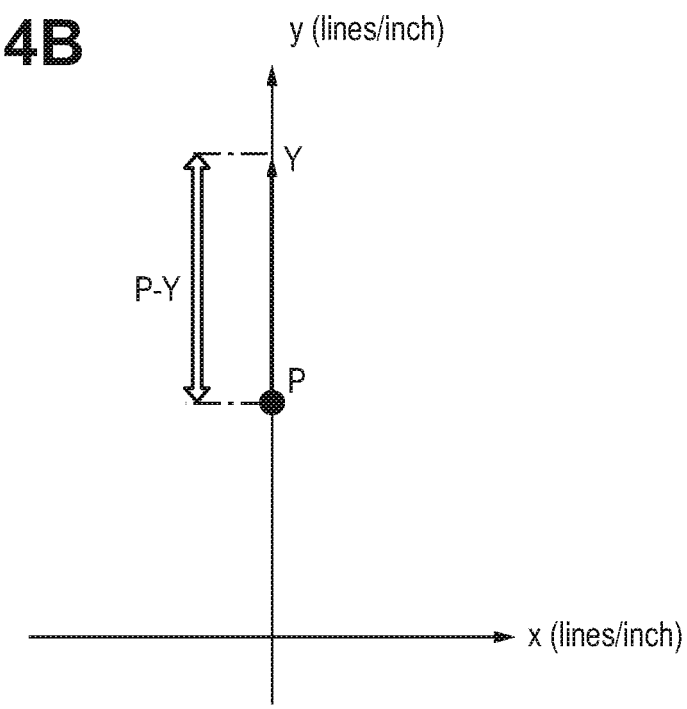

Next, FIGS. 4A and 4B are used to give a description regarding a spatial frequency corresponding to the surface period of the polygonal mirror and the spatial frequencies of the dither of each color. FIG. 4A illustrates a spatial frequency P corresponding to the surface period of the polygonal mirror and the spatial frequencies of the dither of each color. Note that the spatial frequency P is for when N=1 which is easiest to visually recognize, out of the surface period of the polygonal mirror, and information for other surface periods of the polygonal mirror is omitted because they are difficult to visually recognize. In addition, for the dither of each color, only a vector whose distance to the spatial frequency P is closest out of two vectors is illustrated. FIG. 4B illustrates the vector Y and the vector P of FIG. 4A.

The degree to which moire is visually recognized depends on difference in distance between the vectors. Specifically, moire tends not to be visually recognized when the difference in distance is a predetermined value. In the present embodiment, the spatial frequency of the yellow dither for which an image is formed first is separated from the spatial frequency corresponding to the surface period of the polygonal mirror in order to suppress interference with the surface period of the polygonal mirror. Specifically, as illustrated in FIG. 4B, a distance P-Y between the vector P and the vector Y is set to a distance at which moire tends not to be visually recognized. FIG. 3B illustrates the spatial frequency of moire obtained from difference between the vector P and the vectors Y, M, C, and K of respective colors.

Figure 5:
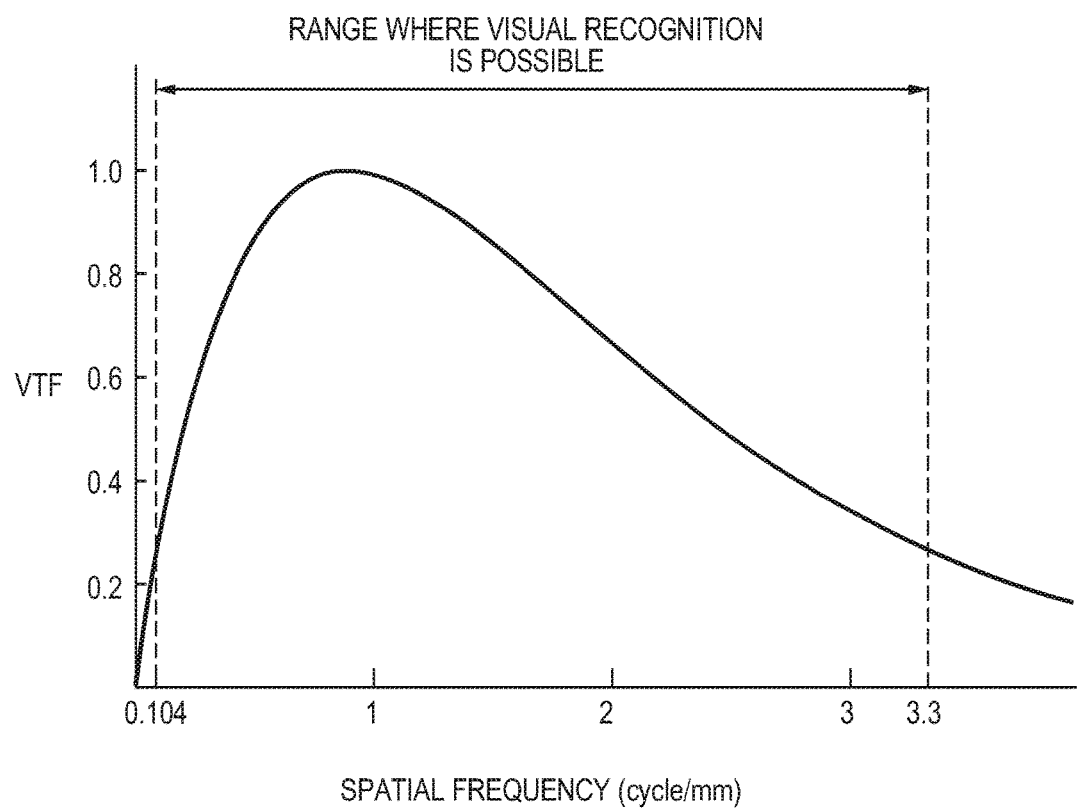
FIG. 5 is a view illustrating a spatial frequency characteristic model for vision according to an embodiment.

Note that the spatial frequencies here are spatial frequency characteristics (hereinafter, VTF: Visual Transfer Function) indicating a level to which moire is visually recognized, proposed by Dooley et al. FIG. 5 illustrates a VTF characteristic in the case where a viewing distance=350 mm. Here, as the VTF increases, moire becomes easier to visually recognize. In FIG. 5, the VTF becomes a maximum near where the spatial frequency is 1.0 (cycles/mm), and moire is easiest to visually recognize. In the present embodiment, it is assumed that moire can be visually recognized when the spatial frequency is in a range of 0.104 to 3.3 (cycles/mm). Accordingly, by FIG. 3B, moire tends not to be visually recognized for yellow and the black. In contrast, magenta and cyan are within the range where moire can be visually recognized. Note that moire is easier to visually recognize as pixel position shift that occurs at the surface period of the polygonal mirror increases. Accordingly, for magenta and cyan at least, it is necessary to suppress moire by correcting position shift of pixels that occurs at the surface period of the polygonal mirror.

Figure 6:
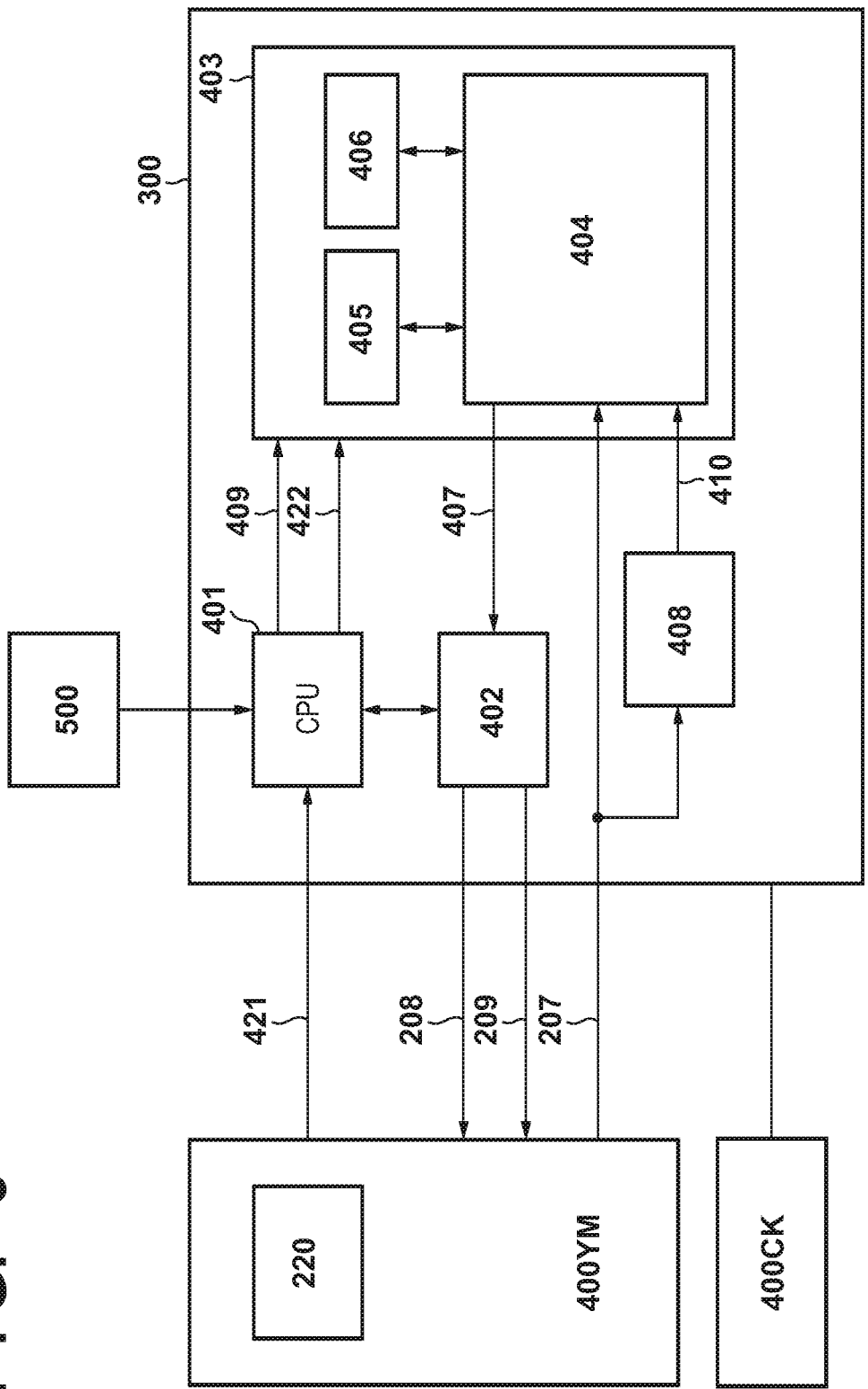
FIG. 6 is a configuration diagram for a control unit according to an embodiment.

FIG. 6 is a configuration diagram of the control unit 300. Note that because the configurations of the optical scanning apparatuses 400YM and 400CK are the same, description is given below by taking, as an example, exposure control with respect to the photosensitive member of the image forming unit 103Y by the optical scanning apparatus 400YM. A light source driving control unit 402 controls lighting of the light source 201 by outputting a light source driving signal 209 based on an image signal (a VDO signal) 407 from an image signal generation unit 403 and a control signal from a CPU 401. The image signal generation unit 403 has an image signal control unit 404, a storage unit 405, and a storage unit 406. The storage unit 405 and the storage unit 406 each store frequency information (hereinafter correction information) for correcting a position shift of a pixel on a scan line caused by the polygonal mirror 202. However, the storage unit 405 stores common correction information that is common for each reflective surface. In contrast, the storage unit 406 stores individual correction information for each reflective surface. The individual correction information includes information indicating a reference reflection surface which is described later. Note that, for the individual correction information, correction of pixel positions common among the reflective surfaces is included, and therefore correction in accordance with the common correction information ceases to be necessary due to correction by the individual correction information. The common correction information and the individual correction information are measured in advance at a time of manufacture of the optical scanning apparatus 400YM, and are stored in the storage unit 220 of the optical scanning apparatus 400YM. The CPU 401 obtains, using a communication signal 421, the common correction information and the individual correction information which are stored in the storage unit 220, and stores the common correction information and the individual correction information in the storage unit 405 and the storage unit 406, respectively, using a communication signal 422.

A measurement unit 408 measures the period of the horizontal synchronization signal 207, and specifies the reference reflection surface of the polygonal mirror 202 based on the reference pattern information. After the specification of the reference reflection surface, the measurement unit 408 outputs a surface reference signal 410 to the image signal control unit 404 at a timing of the horizontal synchronization signal 207 that corresponds to the reference reflection surface. In other words, the surface reference signal 410 is information indicating a specification result by the measurement unit 408. The reference pattern information is measured in advance when the optical scanning apparatus 400YM is manufactured, and is stored in the storage unit 220. The CPU 401 notifies the reference pattern information stored in the storage unit 220 to the measurement unit 408, via a communication signal (not shown).

The image signal control unit 404 generates the image signal (VDO signal) 407 based on the image data after halftone processing (after dither processing) in accordance with the dither illustrated in FIG. 3A, for example. Note that the image signal control unit 404 is configured so as to be able to generate the image signal 407 by correcting the image data after the halftone processing by either the common correction information or the individual correction information. Here, in a case of generating the image signal 407 for which correction is made based on the individual correction information, the individual correction information to use in correction is selected from the individual correction information of the surfaces based on the surface reference signal 410. Then, based on a TOP signal 409 and the horizontal synchronization signal 207 from the CPU 401, the image signal control unit 404 controls an output start timing of the image signal 407 for generating the light source driving signal 209 for driving the light source 201.

Figure 7:
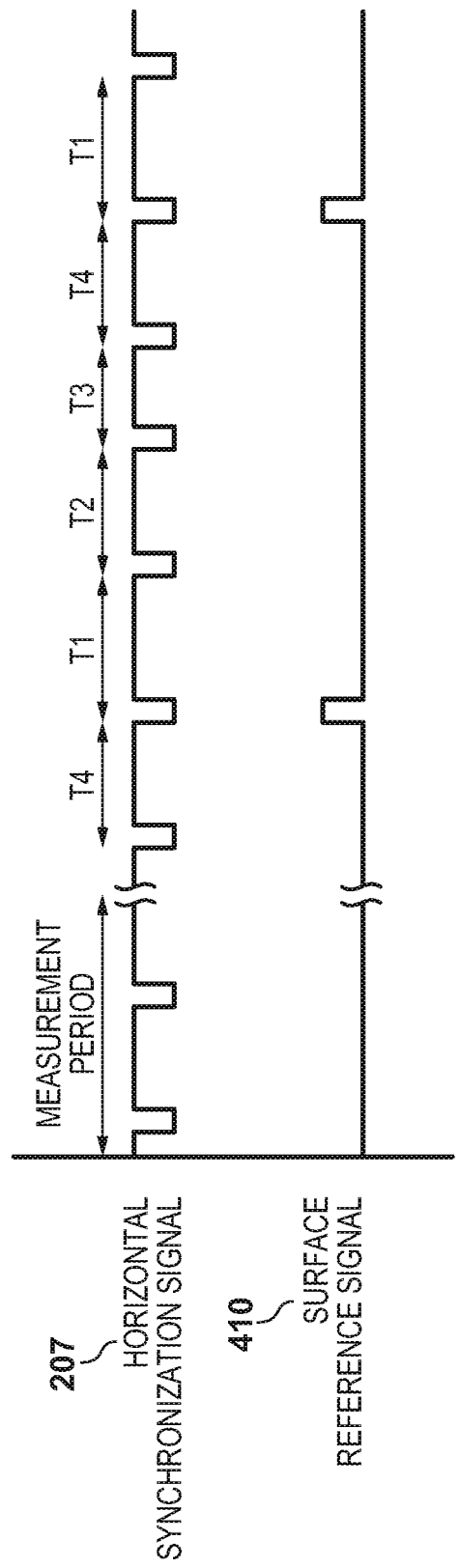
FIG. 7 is a view illustrating a horizontal synchronization signal and a surface reference signal in accordance with an embodiment.

Next, using FIG. 7, description is given regarding surface specification processing by the measurement unit 408. A reflective surface by which the polygonal mirror 202 reflects light is specified by the surface specification processing. Note that, as illustrated in FIG. 7, it is assumed that the horizontal synchronization sensor 206 sets the horizontal synchronization signal 207 to a low level upon detecting reflected light, and otherwise sets the horizontal synchronization signal 207 to a high level. The measurement unit 408 measures a time period between two adjacent low levels of the horizontal synchronization signal 207. As illustrated by FIG. 7, with the polygonal mirror 202, this time period is not the same for each the reflective surface. In other words, the polygonal mirror 202 is made to be slightly heteromorphic instead of a square, so that the period of the horizontal synchronization signal 207 differs for each reflective surface. For example, by slightly varying at least a first internal angle and a second internal angle which are adjacent, out of a plurality of internal angles in the polygonal mirror 202, to have them be different angles and having the shape of the polygonal mirror 202 not be a square, it is possible to unique specify each reflective surface in accordance with surface specification processing. In addition, configuration may be taken to have the plurality of internal angles of the polygonal mirror 202 be different angles. The reference pattern information indicates an order of these time periods and the relationship with the reference reflection surface. In other words, because the polygonal mirror 202 of the present embodiment has four reflective surfaces, the reference pattern information indicates the order of the four time periods T1 through T4, and which time period corresponds to the reference reflection surface. When rotation of the polygonal mirror 202 is started and the rotation speed stabilizes, the measurement unit 408 starts measurement of the time periods between low levels of the horizontal synchronization signal 207. Note that, in order to remove a noise component, the measurement unit 408 measures the period of a time period a plurality of times for each reflective surface, and obtains an average value thereof. By comparing the order of the obtained average values of the reflective surfaces with the reference pattern information, the reference reflection surface is specified. After the specification of the reference reflection surface, the measurement unit 408 outputs the surface reference signal 410 at a timing when the horizontal synchronization sensor 206 detects the reflected light from the reference reflection surface. In this way, the surface specification processing of the polygonal mirror 202 requires a predetermined amount of time.

Figure 8:
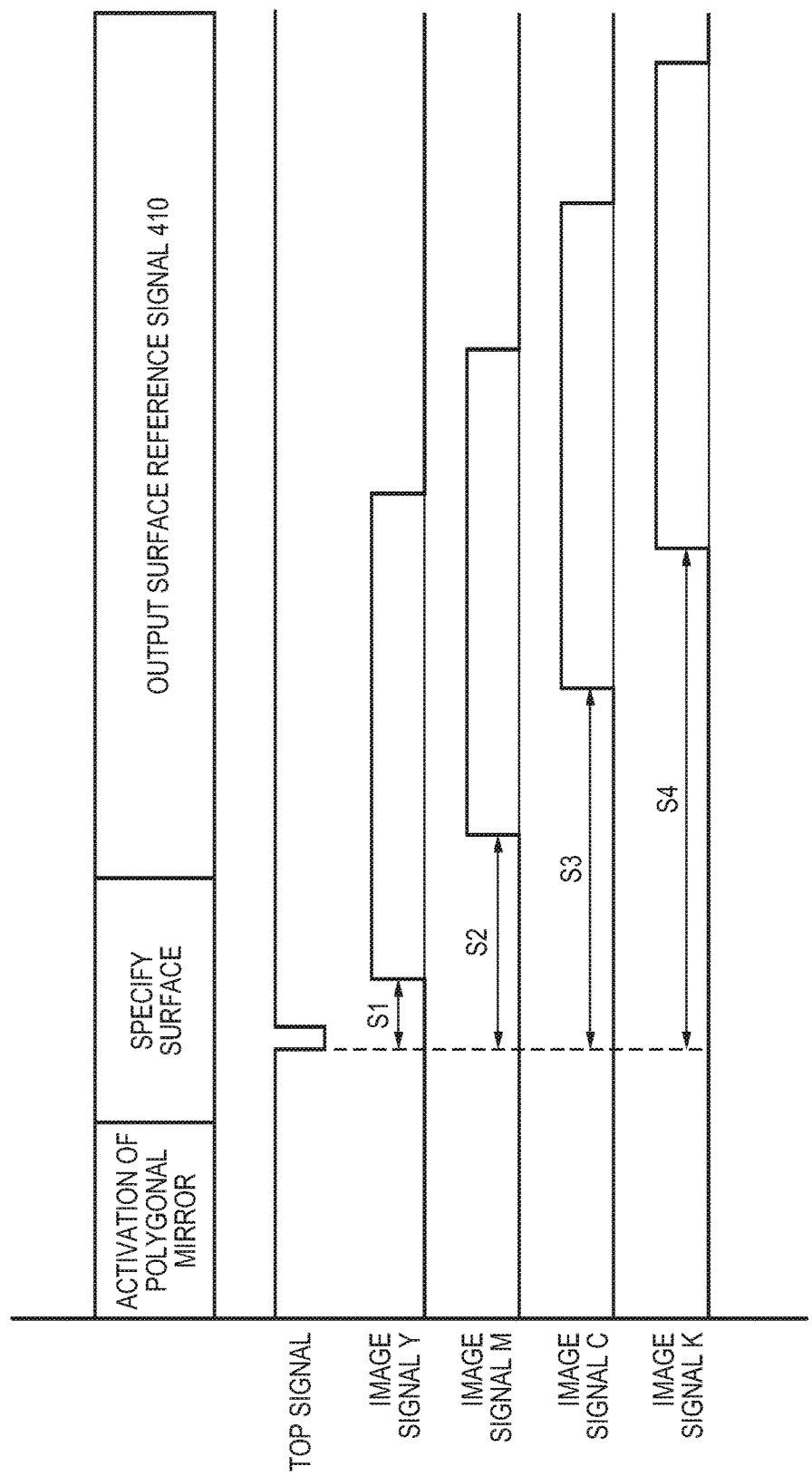
FIG. 8 is a view illustrating output timings of image signals of each color according to an embodiment.

FIG. 8 illustrates a relationship between the timing of respective signals when printing, and the surface specification processing by the measurement unit 408. In accordance with the start of printing, the CPU 401 outputs the TOP signal 409 after a predetermined amount of time from when the polygonal mirror 202 is activated. The image signal control unit 404 outputs the image signals Y, M, C, and K after amounts of time S1, S2, S3, and S4, respectively, from the output of the TOP signal 409. Note that the image signals Y, M, C, and K are respectively image signals 407 for yellow, cyan, magenta, and black. Note that light source driving signals for formation on each photosensitive member and image signals correspond one-to-one, and it is possible to interpret the image signal 407 as a light source driving signal. When rotation of the polygonal mirror 202 stabilizes, the measurement unit 408 performs surface specification processing. As described above, the surface specification processing requires a predetermined amount of time. The measurement unit 408 outputs the surface reference signal 410 when the surface specification processing completes.

Conventionally, after the surface specification processing completes, the image signal control unit 404 outputs the image signal Y for yellow to form an image first. However, in the present embodiment, the image signal control unit 404 outputs the image signal Y for yellow to form an image first and starts exposure of the photosensitive member of the image forming unit 103Y without waiting for completion of the surface specification processing. Accordingly, in the present embodiment, the image signal control unit 404 generates the image signal Y after performing common correction processing for correcting the image data after the halftone processing in accordance with the common correction information which is stored in the storage unit 405. Meanwhile, because the image signals M, C, and K are outputted after the specification of the reference reflection surface, the image signal control unit 404 outputs the image signals M, C, and K after performing individual correction processing for correcting the image data after the halftone processing in accordance with the individual correction information stored in the storage unit 406.

Because the image signal Y for yellow is corrected in accordance with the common correction information, correction of position shift that occurs at a surface period of the polygonal mirror is not performed. However, because moire in accordance with interference with the surface period of the polygonal mirror tends not to be visually recognized for a yellow dither, it is possible to suppress the moire. Meanwhile, because the image signals M, C, and K for magenta, cyan, and black are corrected in accordance with individual correction information, position shift that occurs at a surface period of the polygonal mirror is corrected. Accordingly, as described by FIG. 3B, for example, although moire in accordance with interference with the surface period of the polygonal mirror is easily visually recognized for magenta and cyan dithers, it is possible to suppress moire because position shift that occurs at the surface period of the polygonal mirror is corrected.

Figure 9:
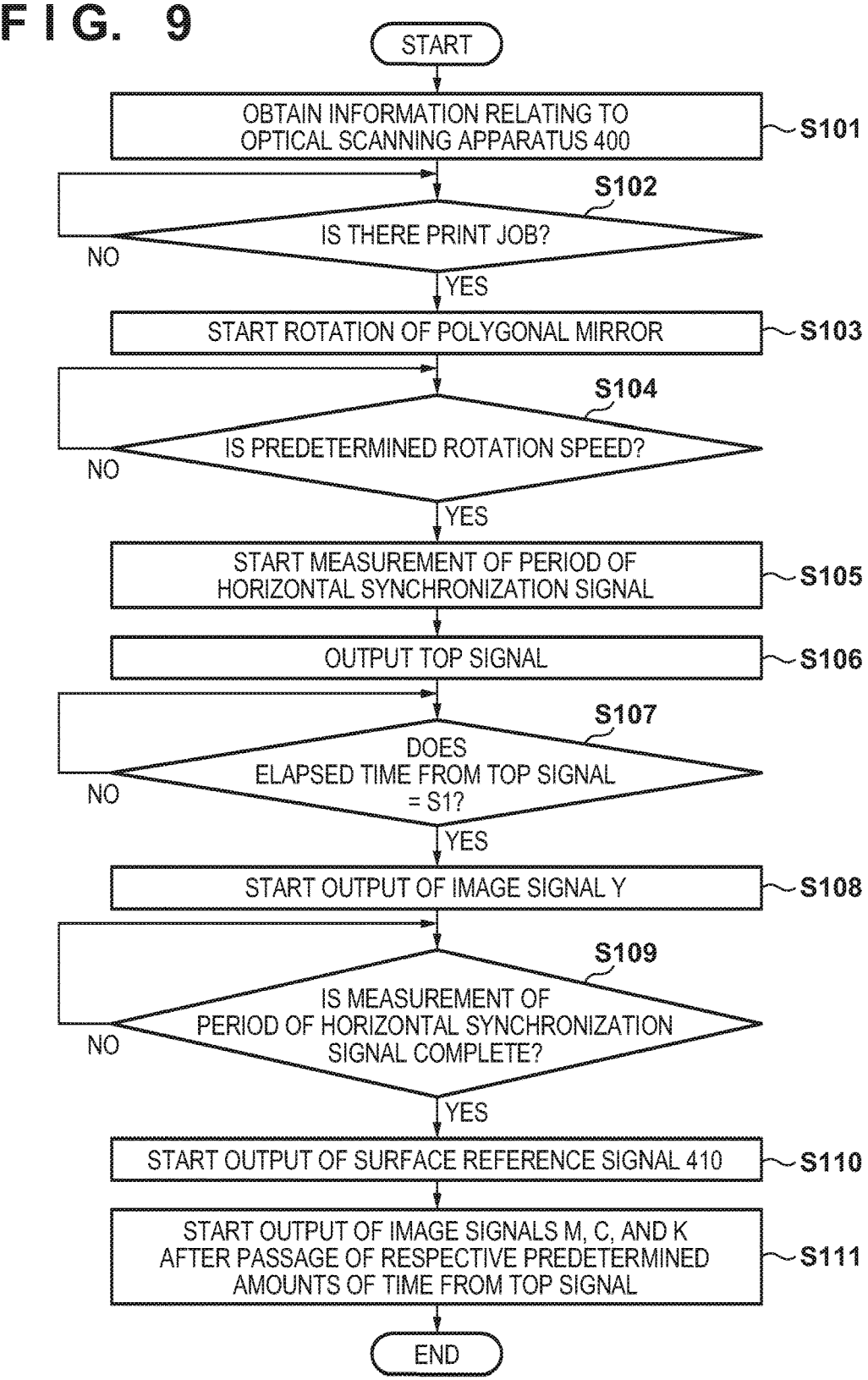
FIG. 9 is a flowchart of processing by a control unit according to an embodiment.

FIG. 9 is a flowchart for processing in the control unit 300. When power is inputted to the image forming apparatus 100, in step S101, the control unit 300 obtains the common correction information, the individual correction information, and the reference pattern information from the storage unit 220 of the optical scanning apparatus 400. Note that, in the present embodiment, the control unit 300 obtains the common correction information for yellow, and obtains individual correction information for the other colors. The control unit 300, in step S102, waits until it receives a print job. Upon receiving a print job, the control unit 300 starts rotation of the polygonal mirror 202 in step S103. Note that, it is assumed here that the print job is a color print job for forming a color image. In step S104, the control unit 300 monitors the period of the horizontal synchronization signal 207, thereby determines the rotation speed of the polygonal mirror 202, and waits until the polygonal mirror 202 reaches a predetermined rotation speed. When the polygonal mirror 202 reaches the predetermined rotation speed, the control unit 300, in step S105, starts measurement of the period of the horizontal synchronization signal 207 in order to specify the reference reflection surface. In addition, the control unit 300, in step S106, outputs the TOP signal 409 at a predetermined timing after the polygonal mirror 202 reaches the predetermined rotation speed. In step S107, the control unit 300 waits until the amount of time S1 passes after the output of the TOP signal 409. When the amount of time S1 passes, the control unit 300, in step S108, starts output of the image signal Y, and accordingly starts output of the light source driving signal 209 for driving the light source 201 for scanning the image forming unit 103Y. Note that the image signal Y is corrected by the common correction information. After starting output of the image signal Y, the control unit 300, in step S109, waits until period measurement of the horizontal synchronization signal 207, which is for specification of the reference reflection surface, completes. When period measurement of the horizontal synchronization signal 207 completes, the control unit 300 specifies the reference reflection surface, and, in step S110, starts output of the surface reference signal 410. Subsequently, the control unit 300, in step S111, outputs each of the image signals M, C, and K at predetermined timings based on the TOP signal. Note that the image signals M, C, and K are all corrected by the individual correction information. Note that correction of the image data may be correction of an image clock used to generate an image signal, and may be correction by inserting/removing a pixel piece that is less than a position pixel with respect to the image data.

Note that any color other than yellow may be the color for the image to form first if moire due to interference with the surface period of the polygonal mirror tends not to be visually recognized for a dither of the color of the image to form first. In addition, in the present embodiment, moire is made difficult to visually recognize by making a yellow dither have a high number of lines, but it is possible to make moire be made difficult to visually recognize in accordance with a screen angle of the dither. In addition, it is possible to make moire be difficult to visually recognize in accordance with an error diffusion method.

Figure 10A:
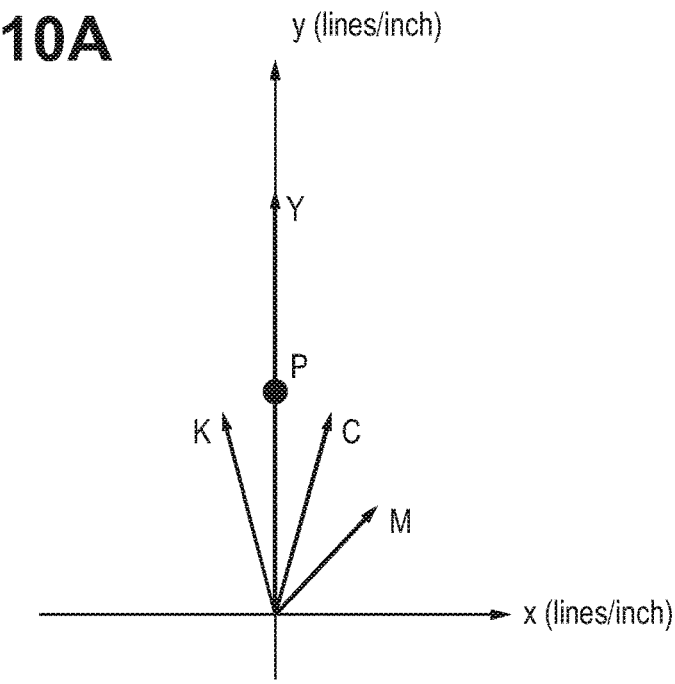
FIGS. 10A and 10B are views illustrating a spatial frequency of each screen and a spatial frequency corresponding to the surface period of the polygonal mirror according to an embodiment.
Figure 10B:
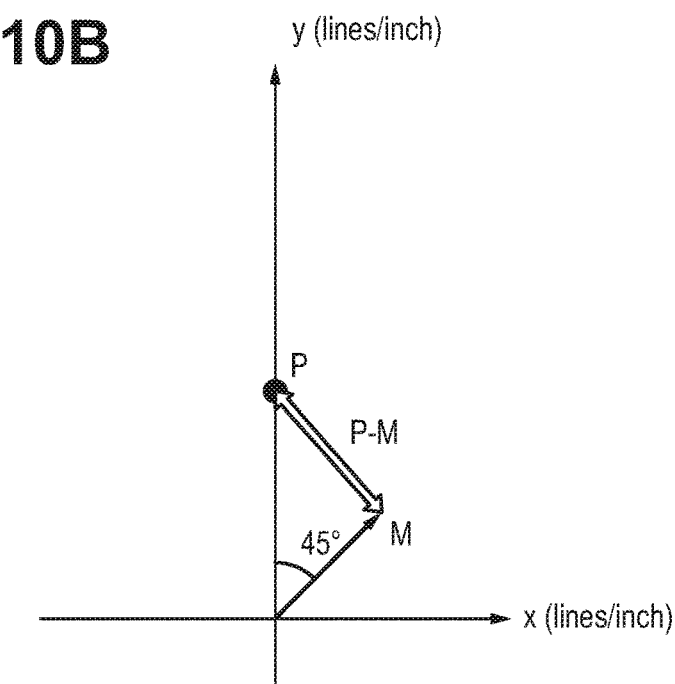

For example, it is possible to use dithers and an image formation order as illustrated by FIG. 3C. In FIG. 3C, the screen angles for the magenta, cyan, and black are set to be separated by 30 degrees respectively, and the screen angle of yellow is set to 90 degrees. FIG. 10A illustrates a vector P (when N=1) for the spatial frequency corresponding to the surface period of the polygonal mirror and vectors of the spatial frequency for each dither, when the dithers of FIG. 3C are used. FIG. 10B illustrates only the vector P and the vector M for magenta. For the dither for magenta which is for forming the first image, the screen angle is set to 45 degrees in order to suppress moire due to interference with the surface period of the polygonal mirror.

Note that, in the present embodiment, the VTF illustrated in FIG. 5 is used as an index for indicating a degree to which moire is visually recognized, but it is possible to use any index that indicates the degree to which moire, which occurs in accordance with interference between the spatial frequency of a dither and the spatial frequency corresponding to the surface period of a polygonal mirror, is visually recognized. At this point, for example a threshold value of the index used is set in accordance with an experiment or the like. For the color for which to form an image first, a dither to apply so that the value of the index is less that a threshold value (moire tends not to be visually recognized) is decided. By such a configuration, it is possible to output an image signal for the color for which to form an image first, without waiting for completion of the surface specification processing. Accordingly, it is possible to shorten the amount of time required for printing. Note that, for other colors, the value of the index may be less than the threshold value or may be greater than or equal to the threshold value. However, for a color that uses a dither where the index is greater than or equal to the threshold value, the individual correction information is always used after the surface specification processing to generate the image signal.

In addition, in the present embodiment, although correction by common correction information is performed for the color for which to form an image first and correction is by individual correction information for remaining colors, the present invention is not limited to such a configuration. For example, in a situation such as where it takes time for specification of a reference reflection surface, it is possible to perform correction by common correction information for the colors for which to form images first and second and perform correction by individual correction information for the remaining colors. However, in this case, the dither to apply for colors for which to form images first and second uses something outside the range where moire due to interference with the surface period of the polygonal mirror can be visually recognized. In other words, it is possible to have a configuration where, for colors for which to start formation prior to specification of the reference reflection surface, a dither that has low interference with the surface period of the polygonal mirror is used and is corrected by common correction information, and for colors where formation starts after the reference reflection surface is specified, correction by the individual correction information is performed.

More specifically, it is possible to have a configuration where a dither outside of the range where moire can be visually recognized is used for one or more first colors for which image signals are outputted first out of a plurality of colors. Note that, after an image signal is outputted for each of the one or more first colors, a dither for the remaining second colors for which to output image signals may be a dither outside of the range where moire can be visually recognized, and may be a dither that is inside the range where moire can be visually recognized. By such a configuration, the control unit 300 can output an image signal for the one or more first colors before the completion of the surface specification processing. Furthermore, the control unit 300 can have a configuration such that one or more third colors that are corrected by the common correction information are decided from the one or more first colors based on an amount of time required for surface specification processing. The control unit 300 outputs an image signal generated by the common correction information before the completion of the surface specification processing for the one or more third colors. In this case, for colors other than the third color out of the one or more first colors, it is possible to generate the image signal in accordance with individual correction information after the completion of the surface specification processing.

Note that, correction in accordance with the common correction information is not necessary, and configuration may be taken such that image formation is performed without performing correction processing on the image data for a color for which formation of an electrostatic latent image is started before the reference reflection surface is specified. For a color for which formation is started before the reference reflection surface is specified, by using a dither where moire tends not to be visually recognized, it is possible to start formation of an electrostatic latent image before specification of the reference reflection surface completes, and it is possible to shorten the amount of time required for printing. In addition, configuration may be taken to perform control for continuing formation of an electrostatic latent image such that, for a color for which formation of the electrostatic latent image starts before the reference reflection surface is specified, until the reference reflection surface is specified correction processing of image data is not performed or correction is performed by the common correction information, and, after the reference reflection surface is specified, correction processing with respect to the image data is performed in accordance with the individual correction information. In this way, even for the color for which formation of the electrostatic latent image is started before the specification of the reference reflection surface, it is possible to suppress the amount of time required for printing and also suppress a decrease in image quality, by performing correction processing in accordance with the individual correction information after the specification of the reference reflection surface.

In addition, in the present embodiment, the position shift of the surface period of the polygonal mirror is corrected by correcting the frequency of the image signal, but position shift correction of the surface period is not limited to something in accordance with frequency. For example, there may be a configuration for correcting a write start position for each reflective surface, or a configuration for correcting the position shift of the surface period of the polygonal mirror by inserting/removing one or more subpixels that are smaller than one pixel width for each predetermined segment.

Note that, in the present embodiment, surface specification processing is performed based on the period of the horizontal synchronization signal at each reflective surface, but there is no limitation to this. For example, it is possible to specify a reflective surface in accordance with a combination of a horizontal synchronization signal for a respective reflective surface, and an FG (Frequency Generator) signal detected from that motor that rotates the polygonal mirror, in accordance with a rotational phase of the polygonal mirror. For example, with a polygonal mirror with four surfaces, configuration is taken to detect four horizontal synchronization signals over one complete rotation, and five FG signals are outputted. With such a configuration, there is a relationship in that two FG signals are detected for one surface out of the four surfaces, and one FG signal is detected for each other surface. By storing in advance the surface for which two FG signals are detected, it is possible to specify each reflective surface of the polygonal mirror.

Second Embodiment

Next, description is given regarding the second embodiment focusing on a point of difference with the first embodiment. In the first embodiment, correction in accordance with the common correction information is always performed for yellow for which an image is formed first. Accordingly, there remains a position shift of the surface period of the polygonal mirror for yellow. In the present embodiment, the image forming apparatus has two modes: an image quality priority mode and a time priority mode, and a user selects or sets one mode. Here, when a user setting is the time priority mode, similarly to in the first embodiment, the image forming apparatus uses the common correction information to generate the image signal Y for yellow for which an image is formed first. In contrast, when a user setting is the image quality priority mode, the image forming apparatus uses the individual correction information to generate the image signal Y for yellow for which an image is formed first. Accordingly, in the present embodiment, the storage unit 406 stores individual correction information for each color.

Figure 11A:
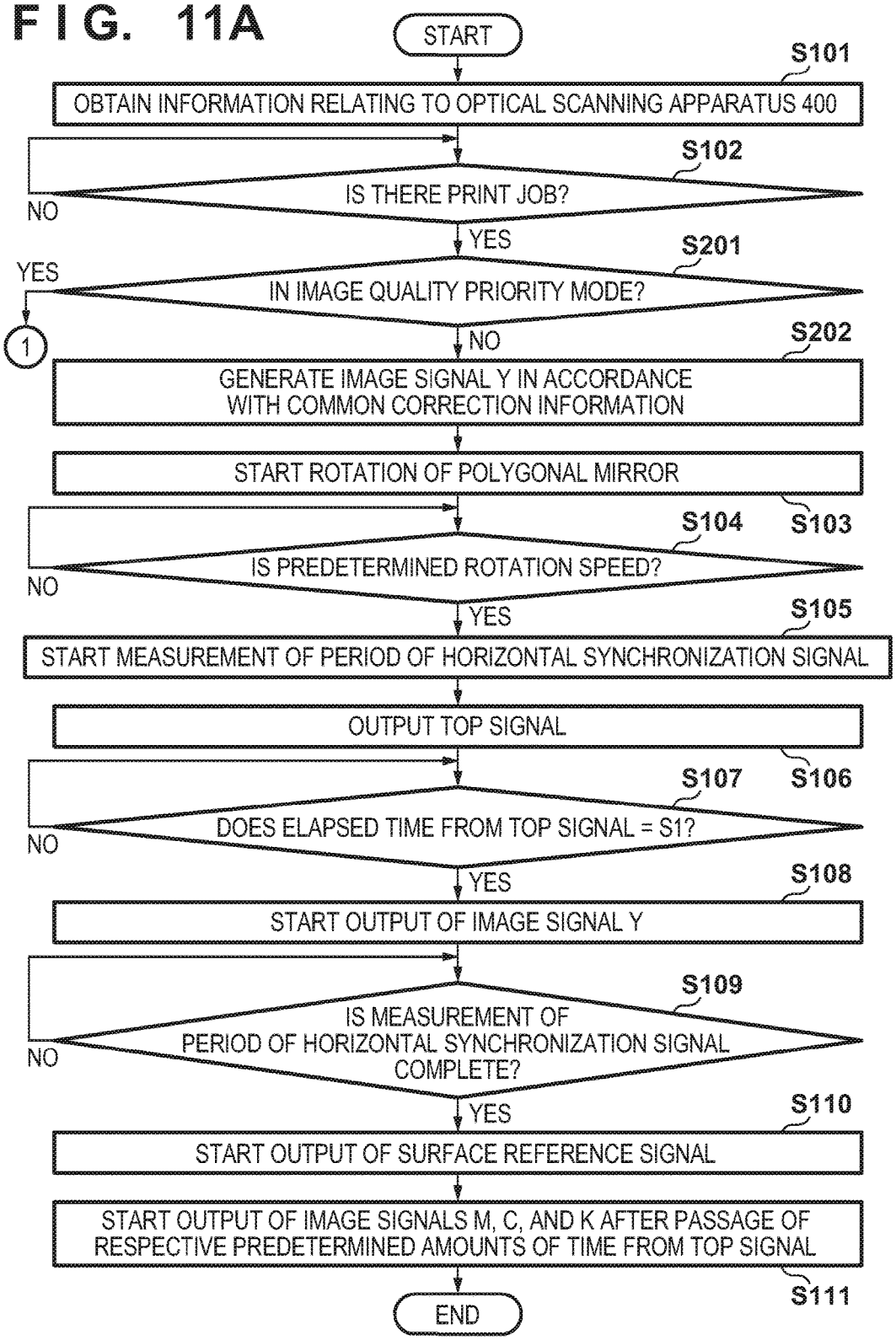
FIGS. 11A and 11B are flowcharts of processing by a control unit according to an embodiment.
Figure 11B:
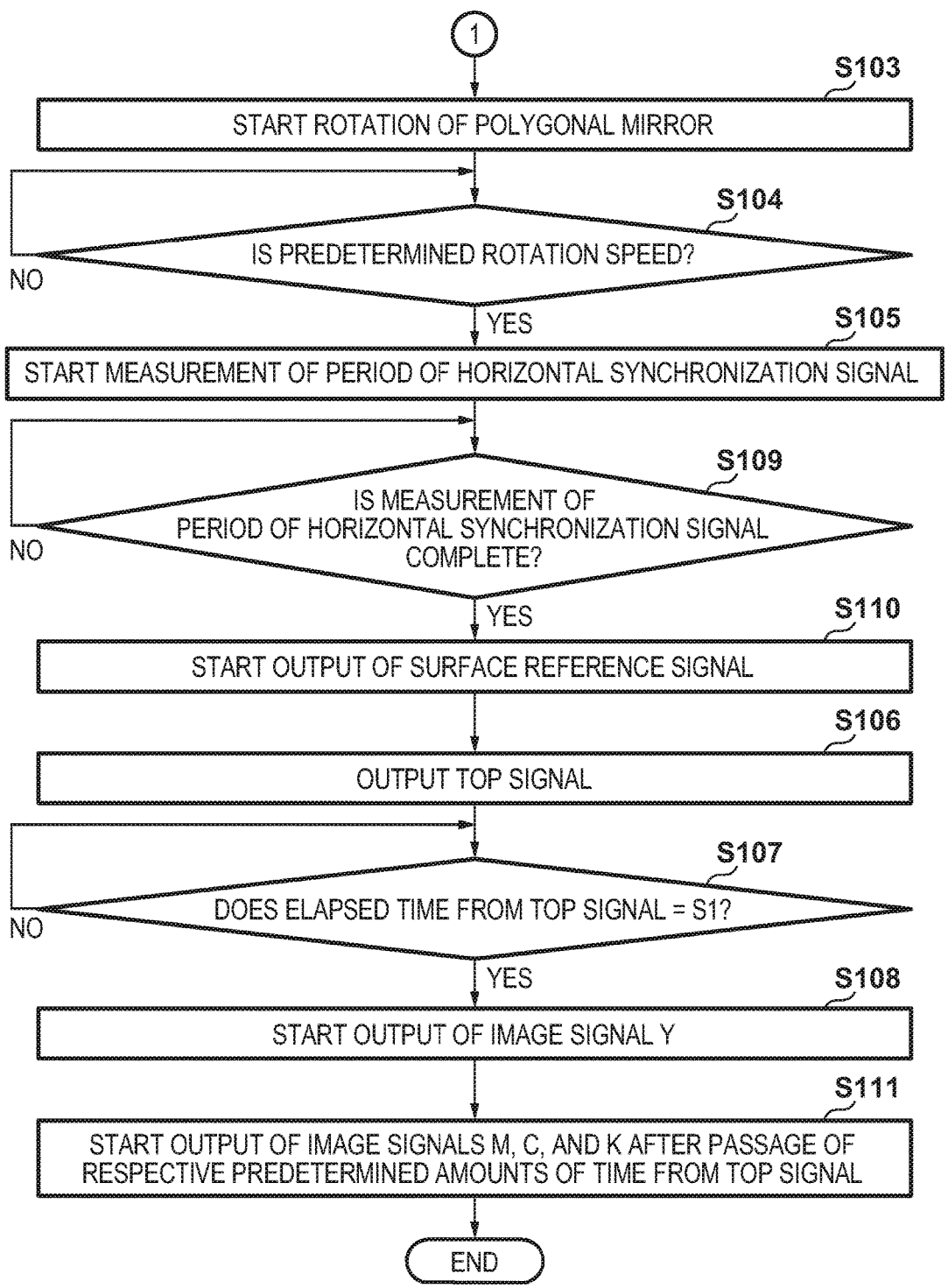

FIGS. 11A and 11B are flowcharts for processing according to the present embodiment. Note that, regarding processing blocks that are similar to those of the first embodiment illustrated in FIG. 9, the same reference numerals are used and explanation thereof is generally omitted. In the present embodiment, the control unit 300, in step S101, obtains from the storage unit 220 the common correction information for yellow, the individual correction information for each color, and the reference pattern information. In step S102, upon receiving a print job, the control unit 300, in step S201, determines whether the image quality priority mode is selected. When the image quality priority mode is not selected, in other words, when the time priority mode is selected, the control unit 300, in step S202, generates the image signal Y in accordance with the common correction information, similarly to in the first embodiment. Subsequent processing is similar to that in the first embodiment. Meanwhile, when the image quality priority mode is selected in step S201, the control unit 300, in step S103, starts rotation of the polygonal mirror 202, and measures the period of the horizontal synchronization signal 207 in step S104, step S105, and S109. In step S109, when period measurement of the horizontal synchronization signal 207 completes, the control unit 300, in step S110, starts output of the surface reference signal 410. In addition, after starting output of the surface reference signal 410, the control unit 300 outputs the TOP signal 409 in step S106 at a predetermined timing. In step S107, the control unit 300 waits until the amount of time S1 passes after the output of the TOP signal 409. When the amount of time S1 passes, the control unit 300, in step S108, starts output of the image signal Y. The image signal Y is corrected by the individual correction information. Subsequently, the control unit 300, in step S111, outputs, at predetermined timings based on the TOP signal 409, each of the image signals M, C, and K corrected by the individual correction information.

Therefore, when the time priority mode is selected in the present embodiment, image formation is started without waiting for completion of specification of the reference reflection surface. Accordingly, it is possible to shorten the amount of time required for printing. Note that, when the image quality priority mode is selected, image formation is started after completion of the specification of the reference reflection surface, but it is possible to increase the quality of images formed by correcting the position shift of the surface period of the polygonal mirror for all colors.

Third Embodiment

Subsequently, description is given regarding the third embodiment focusing on points of difference with the first embodiment. In the present embodiment, description is given regarding a case of forming an image on a plurality of recording materials in one print job. Firstly, in image formation to an initial recording material, processing is performed similarly to in the first embodiment. In other words, for yellow for which an image is formed first, the image signal Y is outputted before completion of the specification of the reference reflection surface. Accordingly, the image signal Y is generated after being corrected in accordance with the common correction information. Meanwhile, when forming images to the second and subsequent recording materials, because specification of the reference reflection surface is complete, an image signal in accordance with individual correction information is generated for all colors.

Figure 12:
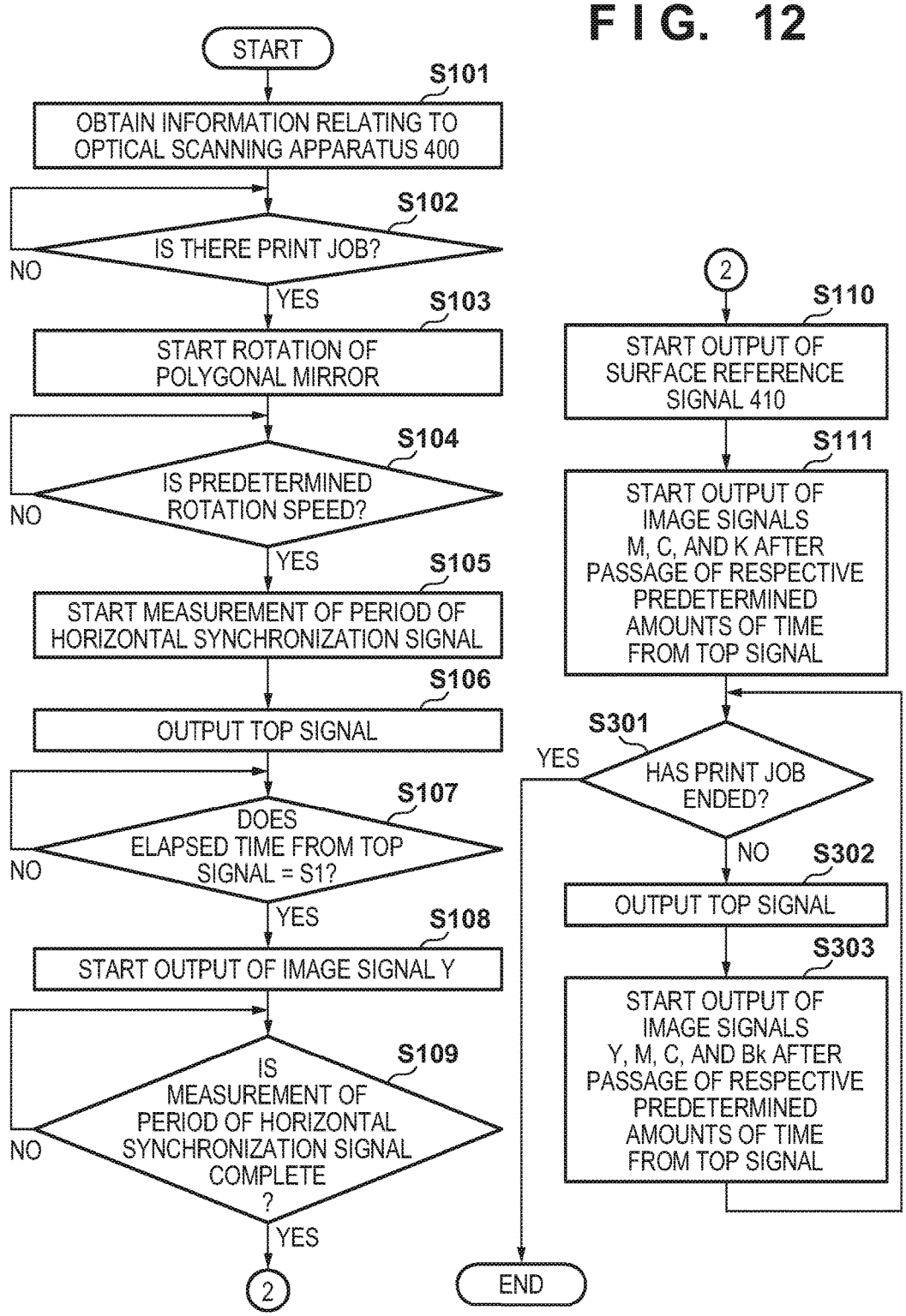
FIG. 12 is a flowchart of processing by a control unit according to an embodiment.

FIG. 12 is a flowchart for processing according to the present embodiment. Note that, regarding processing blocks that are similar to those of the first embodiment illustrated in FIG. 9, the same reference numerals are used and explanation thereof is generally omitted. In the present embodiment, the control unit 300, in step S101, obtains from the storage unit 220 the common correction information for yellow, the individual correction information for each color, and the reference pattern information. Processing for step S102 through step S111 which is subsequent is similar to that of the first embodiment, and an image is formed to a first recording material. The control unit 300, in step S301, determines whether the print job has ended, in other words whether printing to all recording materials designated in the print job has been performed. When printing has been performed for all recording materials, the control unit 300 ends the processing. Meanwhile, when printing has not been performed with respect to all recording materials, the control unit 300 outputs the TOP signal 409 in step S302. In step S303, at a predetermined timing after the output of the TOP signal 409, the control unit 300 outputs each of the image signals Y, M, C, and K. However, the image signals Y, M, C, and K outputted in step S303 are all generated in accordance with the individual correction information.

Fourth Embodiment

Subsequently, description is given regarding the fourth embodiment focusing on a point of difference with the first embodiment. In the present embodiment, the amount of time until printing completes is shortened not only for color printing but even when printing a monochrome image by black. Configuration of a dither for each color in the present embodiment is similar to that in the first embodiment. As illustrated in FIG. 3B, moire in accordance with interference between the position shift of the surface period of the polygonal mirror and a black dither is outside a range that can be visually recognized. In the present embodiment, individual correction information and common correction information are used even for black.

Figure 13:
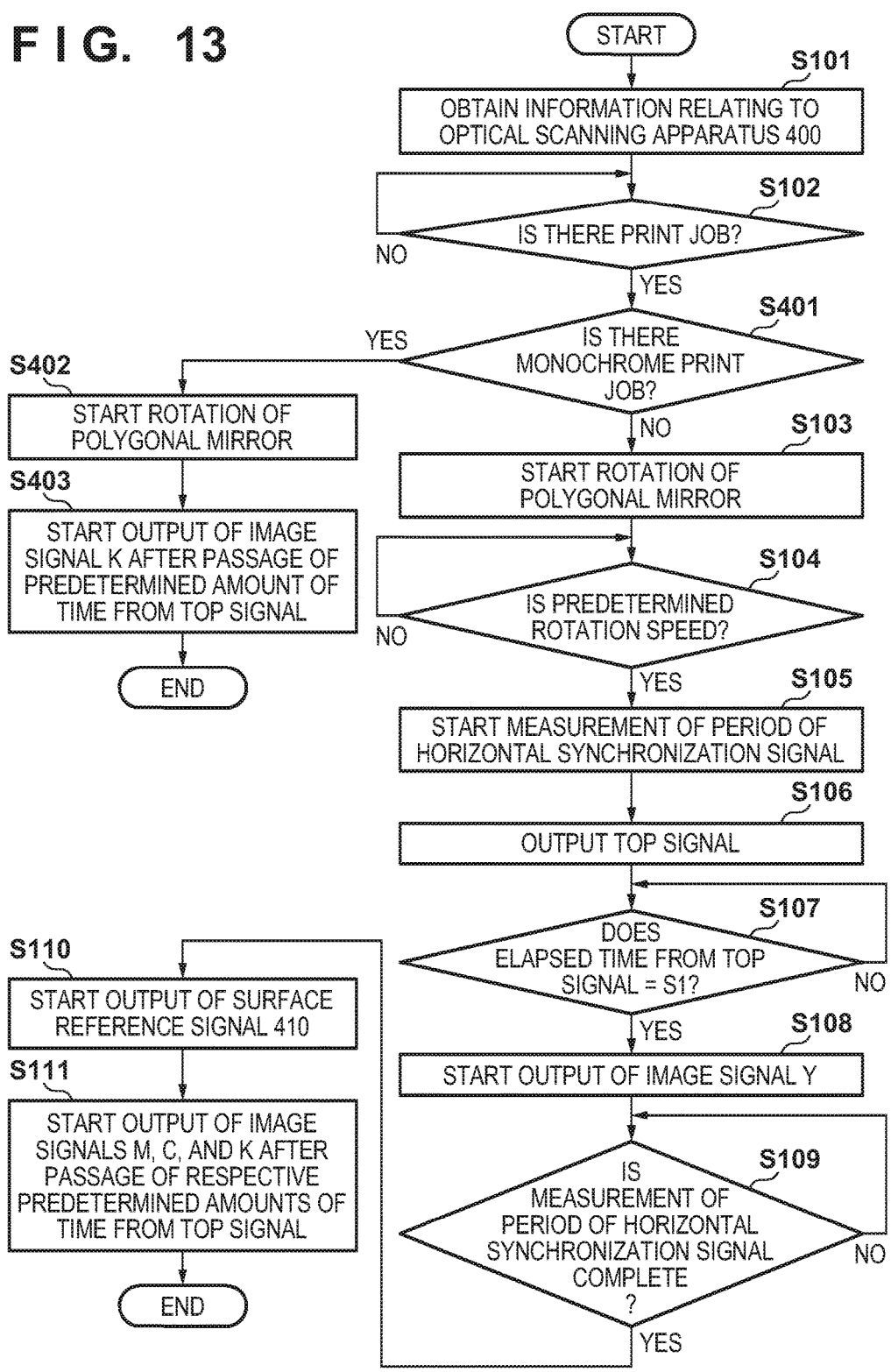
FIG. 13 is a flowchart of processing by a control unit according to an embodiment.

FIG. 13 is a flowchart for processing according to the present embodiment. Note that, regarding processing blocks that are similar to those of the first embodiment illustrated in FIG. 9, the same reference numerals are used and explanation thereof is generally omitted. In the present embodiment, the control unit 300, in step S101, obtains from the storage unit 220 the common correction information for yellow and black, the individual correction information for each color, and the reference pattern information. Upon receiving a print job in step S102, the control unit 300, in step S401, determines whether the received print job is a monochrome print job for printing a monochrome image. When it is not a monochrome print job, in other words when it is a color print job, the control unit 300 executes step S103 through step S111 similarly to in the first embodiment. Meanwhile, in a case of a monochrome print job, the control unit 300 starts the rotation of the polygonal mirror 202 in step S402. The control unit 300 outputs the TOP signal 409 at a predetermined timing after rotation of the polygonal mirror 202 reaches a predetermined rotation speed, and outputs the image signal K when a predetermined amount of time has passed from the TOP signal 409. Note that the image signal K is generated by being corrected by the common correction information.

Therefore, in the present embodiment, surface specification processing is not performed in a case of printing a monochrome image by black. However, a black dither uses something for which moire in accordance with interference with the surface period of the polygonal mirror is outside the range in which it can be visually recognized. In accordance with this configuration, it is possible to form a monochrome image that suppresses moire while reducing the amount of time from the start of the print operation until the completion thereof.

Note that, for example, in the case of a monochrome image forming apparatus, it is possible to select whether to use common correction information or whether to use individual correction information in accordance with whether the image quality priority mode is selected or whether the time priority mode is selected, similarly to in the second embodiment. In other words, when the image quality priority mode is selected, the image signal K is generated in accordance with the individual correction information, and when the time priority mode is selected, the image signal K is generated in accordance with the common correction information. In addition, when the image quality priority mode is selected, the measurement unit 408 performs the surface specification processing, and when the time priority mode is selected, the measurement unit 408 does not perform surface specification processing. Note that a black dither uses something for which moire in accordance with interference with the surface period of the polygonal mirror is outside the range in which it can be visually recognized. Furthermore, configuration may be taken to, in monochrome image forming, generate the image signal K by correcting by the common correction information until the surface specification processing completes, and generate the image signal K by correcting by the individual correction information after the surface specification processing completes.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-144696, filed on Jul. 26, 2017, and No. 2018-085727 filed on Apr. 26, 2018, which are hereby incorporated by reference herein in their entirety.

What is claimed is:

1. An image forming apparatus, comprising:
a first light source and a second light source;
a first photosensitive member corresponding to the first light source and a second photosensitive member corresponding to the second light source;
a transfer unit configured to transfer a first image formed on the first photosensitive member to an image carrier, and to transfer a second image formed on the second photosensitive member onto the image carrier by overlapping the second image on the first image;

a deflection unit configured to deflect light emitted by the first light source and the second light source so that the light emitted by the first light source and the second light source scans respectively corresponding photosensitive members, using at least one rotating polygonal mirror that has a plurality of reflective surfaces;

a specification unit configured to perform surface specification processing for specifying a reflective surface that deflects light, out of the plurality of reflective surfaces of the rotating polygonal mirror, in a state where the rotating polygonal mirror is rotating;

a correction unit configured to perform correction processing for correcting image data in accordance with which reflective surface, out of the plurality of reflective surfaces of the rotating polygonal mirror, deflects light; and a control unit configured to control so as to cause scanning of the first photosensitive member to start before the surface specification processing by the specification unit completes, and control so as to, after the surface specification processing by the specification unit completes, cause the correction processing to be performed by the correction unit, with respect to image data for causing light to be emitted from the second light source and in accordance with a specification result of the surface specification processing, and cause scanning of the second photosensitive member to start, wherein the correction unit is further configured to perform correction processing by correcting image data after halftone processing based on the specification result of the surface specification processing by the specification unit.

2. The image forming apparatus according to claim 1, wherein the control unit is further configured to cause scanning of the first photosensitive member to start without performing correction processing by the correction unit with respect to image data for causing light to be emitted from the first light source, in accordance with the specification result of the surface specification processing.

3. The image forming apparatus according to claim 2, wherein the control unit is further configured to, in a case where the surface specification processing completes before scanning of the first photosensitive member ends after causing scanning of the first photosensitive member to start without the correction processing being performed with respect to image data, perform the correction processing with respect to image data for causing light to be emitted from the first light source and continue scanning of the first photosensitive member after the surface specification processing completes.

4. The image forming apparatus according to claim 1, further comprising a detection unit configured to detect light deflected by the rotating polygonal mirror,
wherein the specification unit is further configured to specify a reflective surface that deflects light, out of the plurality of reflective surfaces of the rotating polygonal mirror, based on a period at which light is detected by the detection unit.

5. The image forming apparatus according to claim 4, wherein the specification unit is further configured to specify a reference reflection surface out of the plurality of reflective surfaces by comparing a plurality of periods respectively corresponding to the plurality of reflective surfaces of the rotating polygonal mirror, and specify a reflective surface that deflects light out of the plurality of reflective surfaces based on the reference reflection surface.

6. The image forming apparatus according to claim 1, wherein the correction unit is further configured to perform correction of a scanning position in accordance with each of the plurality of reflective surfaces of the rotating polygonal mirror by performing correction of image data by the correction processing.

7. The image forming apparatus according to claim 1, wherein the control unit is further configured to, in a case of forming an image on a first recording material in one job, cause scanning of the first photosensitive member to start before the surface specification processing by the specification unit completes, and, in a case of forming an image on a second or subsequent recording material after the first recording material, in accordance with a specification result by the surface specification processing, cause the correction processing by the correction unit to be performed on image data for causing the first light source to emit light, and then cause scanning of the first photosensitive member to start.

8. The image forming apparatus according to claim 1, wherein the control unit is further configured to, in a case where a time priority mode is selected, cause scanning of the first photosensitive member to start before the surface specification processing by the specification unit completes.

9. The image forming apparatus according to claim 1,
further comprising a storage unit configured to store individual correction information for performing the correction processing in accordance with which reflective surface, out of the plurality of reflective surfaces of the rotating polygonal mirror, deflects light,
wherein the correction unit is further configured to correct image data based on the individual correction information.

10. The image forming apparatus according to claim 9, wherein the storage unit further stores common correction information for performing common correction processing for correcting a scanning position by the plurality of reflective surfaces regardless of which reflective surface out of the plurality of reflective surfaces of the rotating polygonal mirror deflects light, and
the correction unit is further configured to correct image data based on the common correction processing before the surface specification processing by the specification unit completes.

11. The image forming apparatus according to claim 1, wherein
the first image formed on the first photosensitive member is developed by a yellow developing agent, and
the second image formed on the second photosensitive member is developed by a magenta, cyan, or black developing agent.

12. The image forming apparatus according to claim 1, wherein
a value of an index indicating a magnitude of moire that occurs due to interference between a screen used in the halftone processing with respect to the image data for causing the first light source to emit light, and a surface period of a rotating polygonal mirror that deflects the light emitted by the first light source is less than a threshold value.

13. The image forming apparatus according to claim 1, wherein
a value of an index indicating a magnitude of moire that occurs due to interference between a screen used in the halftone processing with respect to the image data for causing the second light source to emit light, and a surface period of a rotating polygonal mirror that deflects the light emitted by the second light source is greater than or equal to a threshold value.

14. The image forming apparatus according to claim 1, wherein, for the rotating polygonal mirror, a first internal angle and a second internal angle out of a plurality of internal angles differ so that specifying a reflective surface by the surface specification processing is possible.

15. The image forming apparatus according to claim 1, comprising:
   a detection unit configured to detect light deflected by the rotating polygonal mirror; and
   an output unit configured to output an FG signal in accordance with a rotational phase of the rotating polygonal mirror,
   wherein the specification unit is further configured to, as the surface specification processing, specify a plurality of reflective surfaces of the rotating polygonal mirror based on a timing when light is detected by the detection unit, and a timing when the FG signal is outputted by the output unit.

16. The image forming apparatus according to claim 1, wherein the correction unit is further configured to, as the correction processing, correct the image data by correcting an image clock, or correct the image data by inserting/removing a pixel piece.

17. An image forming apparatus, comprising:
   a first light source and a second light source;
   a first photosensitive member corresponding to the first light source and a second photosensitive member corresponding to the second light source;
   a transfer unit configured to transfer a first image formed on the first photosensitive member to an image carrier, and to transfer a second image formed on the second photosensitive member onto the image carrier by overlapping the second image on the first image;
   a deflection unit configured to deflect light emitted by the first light source and the second light source so that the light emitted by the first light source and the second light source scans respectively corresponding photosensitive members, using at least one rotating polygonal mirror that has a plurality of reflective surfaces;
   a specification unit configured to perform surface specification processing for specifying a reflective surface that deflects light, out of the plurality of reflective surfaces of the rotating polygonal mirror, in a state where the rotating polygonal mirror is rotating;
   a correction unit configured to perform correction processing for correcting a scanning position in accordance with which reflective surface, out of the plurality of reflective surfaces of the rotating polygonal mirror, deflects light; and
   a control unit configured to perform control to, in a case of forming a color image using the first photosensitive member and the second photosensitive member, perform the surface specification processing by the specification unit and perform the correction processing by the correction unit, and, in a case of forming a monochrome image using the second photosensitive member, not perform the surface specification processing by the specification unit and not perform the correction processing by the correction unit.

18. The image forming apparatus according to claim 17, wherein the control unit is further configured to perform control so as to, in a case of forming the color image, perform scanning of the first photosensitive member without performing the correction processing by the correction unit before the surface specification processing by the specification unit completes, and, after the surface specification processing by the specification unit completes, perform the correction processing by the correction unit, and the perform scanning of the second photosensitive member.

19. The image forming apparatus according to claim 17, wherein a value of an index indicating a magnitude of moire arising due to interference between a screen used in halftone processing with respect to image data for forming the monochrome image and a surface period of the rotating polygonal mirror is less than a threshold value.

20. An image forming apparatus, comprising:
   a first light source and a second light source;
   a first photosensitive member corresponding to the first light source and a second photosensitive member corresponding to the second light source;
   a transfer unit configured to transfer a first image formed on the first photosensitive member to an image carrier, and to transfer a second image formed on the second photosensitive member onto the image carrier by overlapping the second image on the first image;
   a deflection unit configured to deflect light emitted by the first light source and the second light source so that the light emitted by the first light source and the second light source scans respectively corresponding photosensitive members, using at least one rotating polygonal mirror that has a plurality of reflective surfaces;
   a specification unit configured to perform surface specification processing for specifying a reflective surface that deflects light, out of the plurality of reflective surfaces of the rotating polygonal mirror, in a state where the rotating polygonal mirror is rotating;
   a correction unit configured to perform correction processing for correcting a scanning position in accordance with which reflective surface, out of the plurality of reflective surfaces of the rotating polygonal mirror, deflects light; and
   a control unit configured to perform control to, in a case of forming an image in an image quality priority mode, perform the surface specification processing by the specification unit and perform the correction processing by the correction unit, and, in a case of forming an image in a time priority mode, not perform the surface specification processing by the specification unit and not perform the correction processing by the correction unit.

* * * * *